United States Patent
Aylward (10) Patent No.: US 7,892,473 B2
(45) Date of Patent: Feb. 22, 2011

(54) FEEDER TUBE FOR FILLING CONTAINERS WITH PILLS

(75) Inventor: John Thomas Aylward, New Bern, NC (US)

(73) Assignee: Aylward Enterprises, LLC, New Bern, NC (US)

( * ) Notice: Subject to any disclaimer, the term of this patent is extended or adjusted under 35 U.S.C. 154(b) by 222 days.

(21) Appl. No.: 11/531,843

(22) Filed: Sep. 14, 2006

(65) Prior Publication Data

US 2007/0007693 A1    Jan. 11, 2007

Related U.S. Application Data

(60) Division of application No. 11/033,018, filed on Jan. 11, 2005, now Pat. No. 7,124,912, which is a continuation of application No. 10/224,987, filed on Aug. 21, 2002, now Pat. No. 7,066,350.

(51) Int. Cl.
    *B29C 35/04* (2006.01)
(52) U.S. Cl. .................. 264/401; 264/113; 264/308
(58) Field of Classification Search ........... 264/113, 264/308, 401; 425/174.4
    See application file for complete search history.

(56) References Cited

U.S. PATENT DOCUMENTS

| | | | |
|---|---|---|---|
| 2,878,915 A | 3/1959 | Judge | |
| 2,886,157 A | 5/1959 | Hall | |
| 2,905,295 A | 9/1959 | Anderson | |
| 3,139,713 A | 7/1964 | Merrill et al. | |
| 3,530,639 A | 9/1970 | Bross | |
| 3,712,510 A | 1/1973 | Lindahl | |
| 3,870,143 A | 3/1975 | Heybourn et al. | |
| 3,968,902 A | 7/1976 | Bachmann | |
| 4,265,072 A | 5/1981 | Egli | |
| 4,458,801 A | 7/1984 | Nichols | |
| 5,111,926 A | 5/1992 | Long | |
| 5,121,329 A | 6/1992 | Crump | |

(Continued)

FOREIGN PATENT DOCUMENTS

WO    WO 00/62994    10/2000

OTHER PUBLICATIONS

Declaration of Matt Neumann dated Jul. 28, 2005 relating to Pill Feed Equipment from Uhlmann Packaging Systems, 4 pages.

*Primary Examiner*—Joseph S Del Sole
*Assistant Examiner*—James Sanders
(74) *Attorney, Agent, or Firm*—Alston & Bird LLP (57) ABSTRACT

A pill delivery and packing apparatus having a feeder tube for delivering pills is provided. The feeder tube has a helical delivery chute that extends between an inlet side and an exit side of the tube. The delivery chute has a helical inner contour and a rectangular cross section that corresponds to the shape of the pills. The helical delivery chute is configured such that each of the pills rotates while proceeding through the delivery chute, whereby such rotation of the pills prevents jamming of the pills in the delivery chute. Independently extendable pins are used to alternately block and open the delivery chute, thus providing an escapement mechanism for dispensing pills. The tube also has an outer surface defining a helical outer contour that guides a rotatable tray on which pills are disposed. Associated apparatuses and methods are also provided.

16 Claims, 8 Drawing Sheets

U.S. PATENT DOCUMENTS

| | | | |
|---|---|---|---|
| 5,737,902 A * | 4/1998 | Aylward | 53/475 |
| 5,849,238 A | 12/1998 | Schmidt et al. | |
| 5,997,795 A * | 12/1999 | Danforth et al. | 264/401 |
| 6,062,423 A | 5/2000 | Saito et al. | |
| 6,116,401 A | 9/2000 | Carleton | |
| 6,153,034 A | 11/2000 | Lipsker | |
| 6,185,901 B1 | 2/2001 | Aylward | |
| 6,214,279 B1 * | 4/2001 | Yang et al. | 264/482 |
| 6,237,804 B1 | 5/2001 | Peery et al. | |
| 6,266,946 B1 | 7/2001 | Aylward | |
| 6,269,612 B1 | 8/2001 | Aylward | |
| 6,283,325 B1 | 9/2001 | Saito et al. | |
| 6,290,095 B1 | 9/2001 | Saito et al. | |
| 7,066,350 B2 * | 6/2006 | Aylward | 221/232 |
| 7,124,912 B2 * | 10/2006 | Aylward | 221/236 |

* cited by examiner

FEEDER TUBE FOR FILLING CONTAINERS WITH PILLS

CROSS-REFERENCE TO RELATED APPLICATIONS

This application is a divisional of U.S. application Ser. No. 11/033,018, filed Jan. 11, 2005 now U.S. Pat. No. 7,124,912, which is a continuation of U.S. application Ser. No. 10/224,987, filed Aug. 21, 2002, now U.S. Pat. No. 7,066,350, which are hereby incorporated herein in their entirety by reference.

BACKGROUND OF THE INVENTION

1) Field of the Invention

The present invention relates to pill packaging and, more particularly, to apparatuses and methods for delivering and packaging pills, tablets, capsules, and the like.

2) Description of Related Art

Pharmaceutical products such as pills, tablets, capsules, caplets, gel caps, dragees, and the like are often packaged in containers such as bottles, pouches, blister packages, sachets, or boxes. Each container may comprise a plurality of pill receptacles that are to be individually filled with one or more pills. This procedure is preferably performed by an automated machine capable of precisely and accurately delivering the pills at a high rate of speed. Conventional packaging machines include a plurality of dispensing tubes and chutes that guide the pills toward the pill receptacles. Precise orientation and placement of the pills can be critical to the process, for example when the pills are placed into a disposable pouch that is subsequently covered with foil. An exemplary form of such an apparatus is described in U.S. Pat. No. 5,737,902 to Aylward for "Apparatus and Method for Packaging Pills." One embodiment of the packaging apparatus includes a tray for supporting an accumulation of pills over a drop chute. The tray is reciprocally raised and lowered to cause the pills to fall through an opening in the tray and into a tube that extends through the opening of the tray. The pills fall through the tube and into the drop chute, which guides the pills toward a container.

Figure 12:
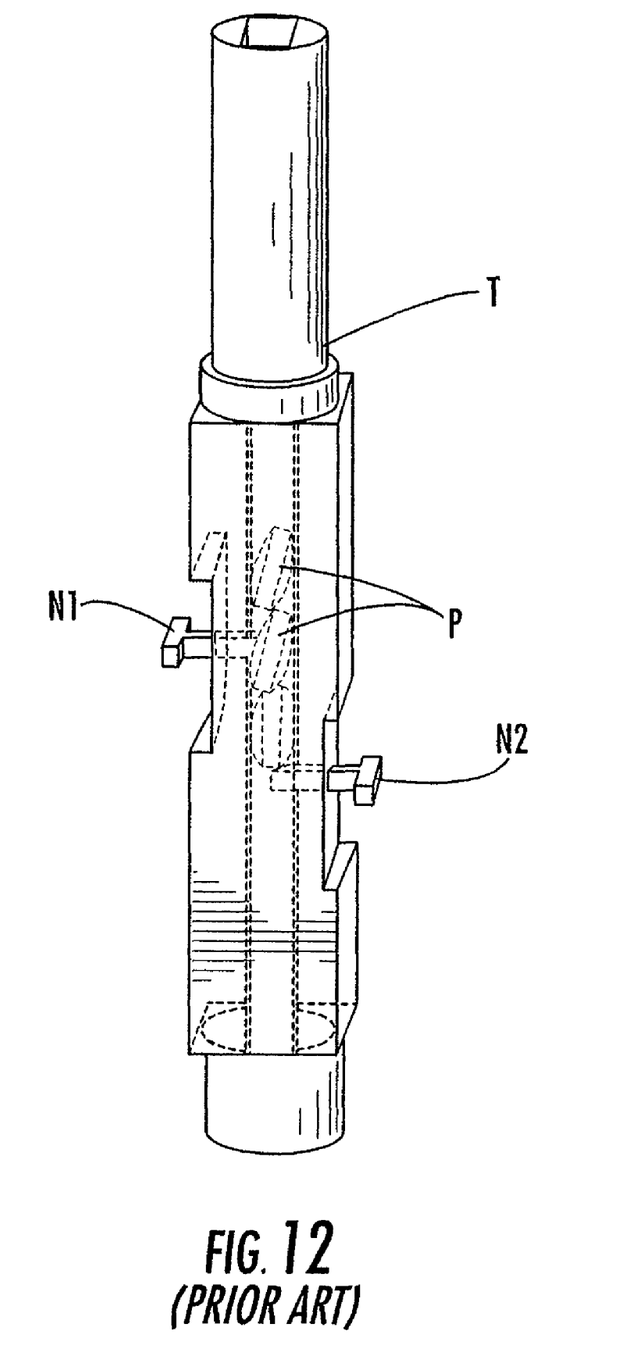
FIG. 12 is a partially transparent view of a dispensing tube according to the prior art illustrating pills in a shingled configuration.

Although this type of feeder has achieved commercial acceptance, problems may arise if the tube or drop chute becomes blocked with pills. Blockage of the tube or drop chute can occur if adjacent pills shingle upon one another. Shingling occurs when a pill becomes wedged between an adjacent pill and the wall of the tube or chute. For example, as shown in FIG. 12, shingling can occur in a dispensing tube T where the pills P are stopped by pins N1, N2 that control the rate of release of the pills. The shingling of the pills P prevents the pills from falling though the tube T when the pins N1, N2 are retracted from the tube. Blockage within the tubes can increase maintenance costs, reduce the speed of the packaging process, and cause some pill receptacles to go unfilled. Unfilled pill receptacles result in defective packages and necessitates rework, thereby increasing packaging costs.

In order to reduce the likelihood of shingling, some tubes are designed to be only slightly larger than the pills that fall therethrough so that there is insufficient space between a pill and the wall of the tube for another pill to fit. However, the size of the pills is determined in part by the composition of the pill material, and therefore pill sizes may vary from lot to lot. Thus, keeping the tube size closely matched to the pill size can necessitate different sized tubes for different lots, even if successive lots contain similar pills. The need for additional tubes increases the average expense of operating the machine. Additionally, changing the tubes between each lot requires stopping the machine and, hence, decreases the throughput. Moreover, shingling can still occur even when tubes are changed for each lot, especially if there are variations in pill size within a single lot of pills. The particular characteristics of some pills, such as shape, hardness, surface roughness, and the like, can also increase the likelihood of shingling.

Another problem occurs when the pills that are disposed on the tray do not fall into the tube. Although the reciprocal raising and lowering of the tray is usually effective in agitating the pills, the pills sometimes become arranged such that they are not easily moved and encouraged into the tube. One such arrangement occurs when two or more pills become simultaneously lodged in the opening of the tube. Until this arrangement is disturbed, the lodged pills block each other and the other pills from entering the tube. Alternatively, a number of pills may become arranged in a "bridged" configuration, wherein the pills are stacked in a relatively stable structure that defines a hollow, cave-like interior. This stacked arrangement also prevents pills from entering the tube. Like blockage within the tubes, failure of the pills to fall into the tubes can reduce the speed of the packaging process and cause some pill receptacles to go unfilled. Again, defective packages, rework, and increased maintenance increases packaging costs.

Thus, there is a need for an improved packaging apparatus for delivering and placing pills and the like into pill receptacles and containers. Such an apparatus should not have the disadvantages associated with conventional systems and should be able to precisely and reliably place pills into pill receptacles in a desired orientation. Such an apparatus should decrease the risk of blockage of pills within the tube, for example, by shingling, and should also increase the likelihood and efficiency of delivering pills into the tube.

BRIEF SUMMARY OF THE INVENTION

Embodiments of the present invention meet these needs and others by the use of a feeder tube having a helical delivery chute that prevents shingling as explained below. The feeder tube may also or alternatively have a helical outer contour. The helical outer contour and the helical delivery chute extend between an inlet side and an exit side of the tube. As pills proceed through the feeder tube, the helical delivery chute causes each pill to rotate about an axis that is generally parallel to the direction of travel. Thus, each pill is positioned at a rotational position that differs from adjacent pills, decreasing the likelihood of shingling. Additionally, the helical outer contour engages a corresponding aperture defined by an axially reciprocating tray so that part of the tray is made to rotate as the tray reciprocates. This rotation agitates the pills and facilitates entry of the pills into the tube.

The helical delivery chute has a rectangular cross section that corresponds to the shape of the pills. The lead length of the helical contour is between about one and about four inches. An access slot extends from an outer surface of the feeder tube to the delivery chute. The opposing walls of the access slot each define a retaining slot that retains an elongate member along the length of the access slot. Independently extendable pins are used to alternately block and open the delivery chute, thus providing an escapement mechanism for dispensing pills.

Embodiments of the invention also provide a pill delivery apparatus that includes a feeder tube, trays for feeding pills into the tube, and a drop chute that guides pills for delivery from the delivery apparatus. The trays include a rotatable inner tray that is rotatably engaged with an outer tray. A helical outer surface of the feeder tube corresponds to an aperture defined by the inner tray such that when the tray is axially moved to insert the feeder tube into the aperture or retract the feeder tube from the aperture, the rotatable inner tray is rotated due to interaction with the helical outer surface.

Additionally, embodiments of the invention provide a packaging apparatus for placing pills into a series of pill receptacles. The apparatus includes a pill delivery apparatus implementing a feeder tube defining a helical delivery chute, a frame, and a conveyor for conveying the series of pill receptacles.

Further, embodiments of the present invention provide a method of delivering pills. The pills are disposed on a rotatable inner tray and urged into a helical delivery chute of a feeder tube, for example, by moving the tray axially with respect to the feeder tube to cause rotation of the tray. The pills are rotated during delivery through the delivery chute and dispensed in a controlled manner by alternately moving pins into and out of the delivery chute.

The feeder tube can be formed by fused deposition modeling, for example, by plasticizing a thermoplastic polymer, depositing the polymer in successive layers to define the feeder tube and the delivery chute therein, and solidifying the polymer. A soluble material can also be deposited to support at least a portion of the polymer. The soluble material is dissolved after the polymer is solidified to thereby define a void in the feeder tube.

BRIEF DESCRIPTION OF THE SEVERAL VIEWS OF THE DRAWING(S)

Having thus described the invention in general terms, reference will now be made to the accompanying drawings, which are not necessarily drawn to scale. For example, it is noted that the helical delivery chute is shown with exaggerated proportions for illustrative purposes only. In practice, the dimensions of the helical delivery chute are such that a small clearance is provided between the walls of the delivery chute and a pill passing through the delivery chute. In the drawings:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
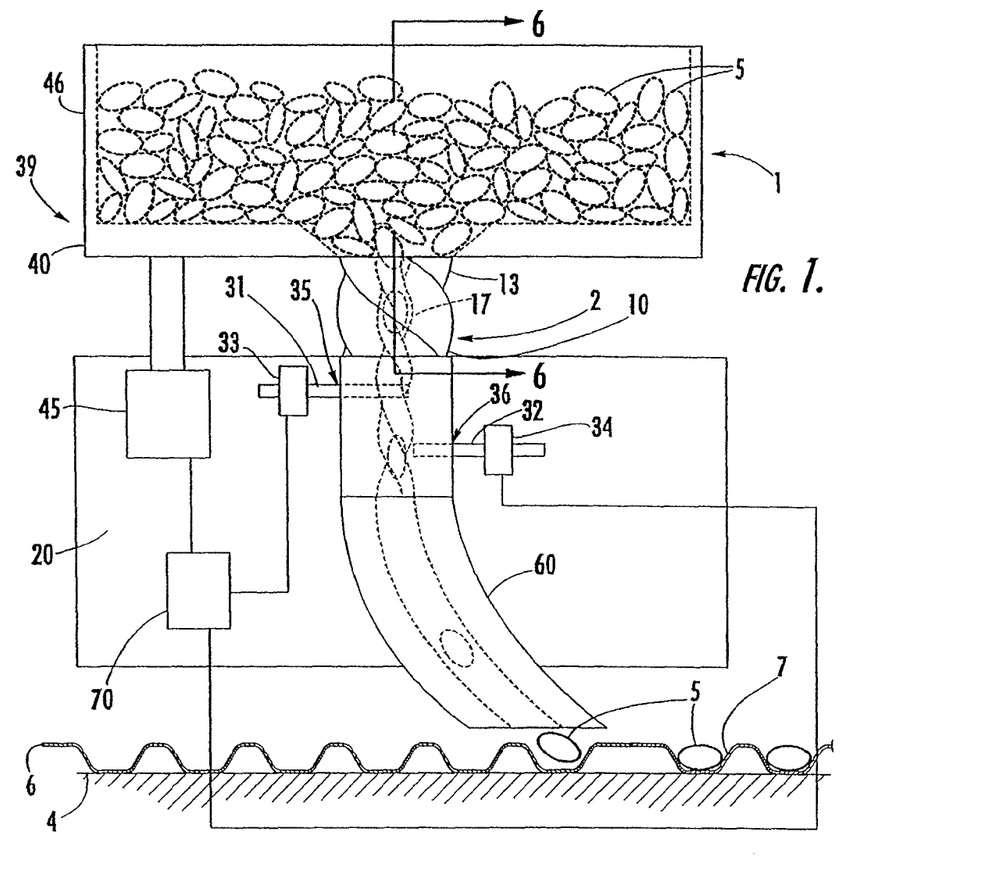
FIG. 1 is cross-sectional schematic of a packaging apparatus according to one embodiment of the present invention with the trays in the raised position.

Generally described, embodiments of the present invention are directed to a packaging apparatus 1 implementing a pill delivery apparatus 2 having a feeder tube 10 for delivering pills 5 from a tray 39 to a plurality of pill receptacles 7 in containers 6. One embodiment of such a packaging apparatus 1 is shown in FIG. 1. The term "pill" is used herein throughout, but the term is not intended to be limiting and includes any discrete articles of the type used in the pharmaceutical industry or otherwise including, but not limited to, capsules, caplets, gel caps, dragees, and tablets. Similarly, the receiving container 6 can be any one of a number of configurations that provide an opening for receiving pills 5 therein, such as bottles, pouches, blister packages, sachets, or boxes. Each container 6 may comprise a plurality of individual pill receptacles 7 that are to be separately filled with one or more pills 5, as is the case for a multi-receptacle disposable pouch. Alternatively, each container 6 may receive a plurality of pills 5 into a single common space, as is the case for a conventional pill bottle.

Figures 2, 2A, 3:
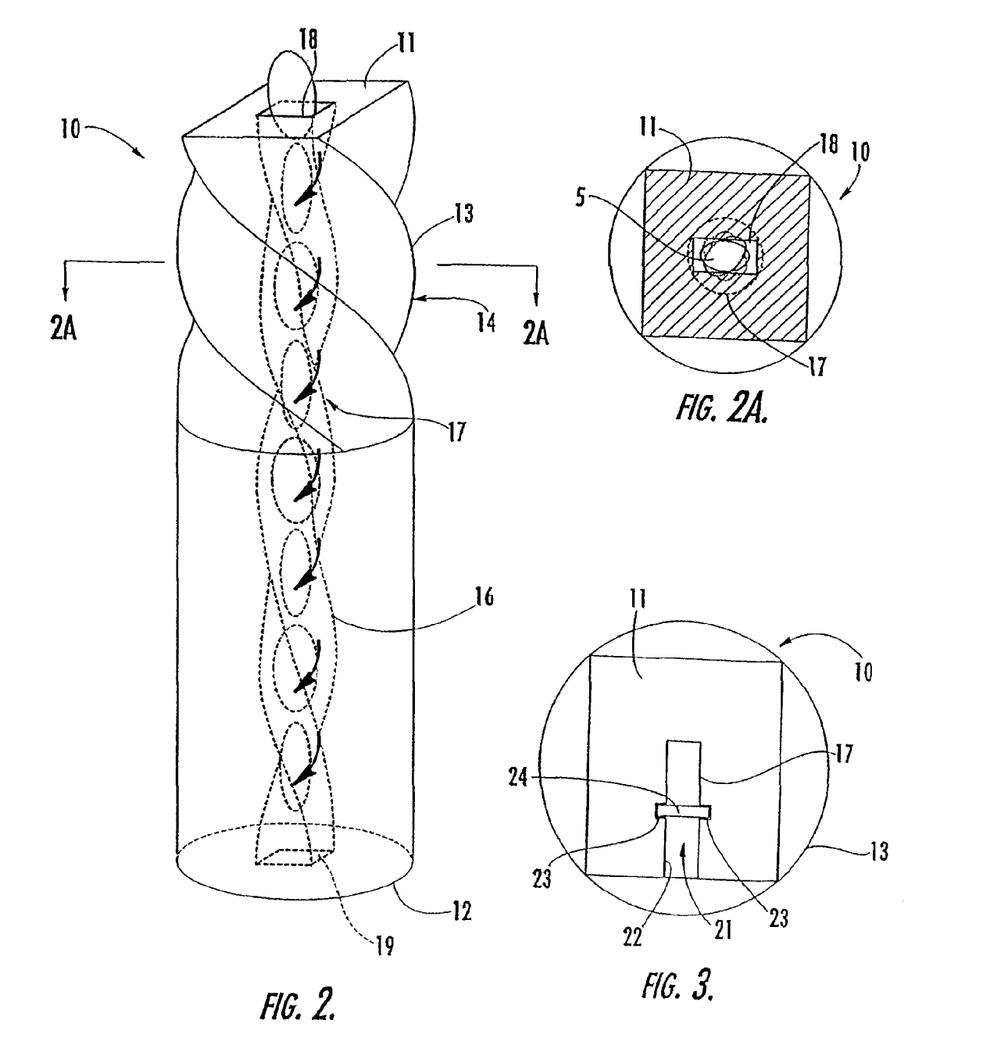
FIG. 2 is a perspective view of a feeder tube having a helical outer surface according to one embodiment of the present invention.
FIG. 2A is a cross-sectional view of a feeder tube as shown in FIG. 2 taken at line 2A-2A of FIG. 2.
FIG. 3 is plan view of the inlet side of a feeder tube according to one embodiment of the present invention.

One embodiment of a feeder tube 10 according to the present invention is shown in FIG. 2. An outer surface 13 of the feeder tube 10 extends between an inlet side 11 and an exit side 12. In this embodiment, the outer surface 13 defines a helical outer contour 14. However, in other embodiments, the outer surface 13 may define other shapes or contours including, for example, a right circular cylinder. A helical delivery chute 17 has a helical inner contour 16 and extends between an inlet 18 and an exit 19 defined by the inlet side 11 and exit side 12, respectively. In one embodiment, shown in FIG. 3, the feeder tube 10 may also define an access slot 21 that extends from the outer surface 13 of the feeder tube 10 to the helical delivery chute 17. The access slot 21 is an optional feature of the feeder tube 10 that is provided, in part, for ease of manufacture. The access slot 21 also provides access to the helical delivery chute 17 for treatment, maintenance, or inspection. The access slot 21 is defined by slot walls 22. The slot walls 22 each define a retaining slot 23 that retains an elongate member 24 that is slid into the retaining slot 23 and extends from the inlet side 11 to the exit side 12. The elongate member 24 provides a barrier between the helical delivery chute 17 and the access slot 21 and thus partially defines the helical delivery chute 17. Preferably, the elongate member 24 is formed of a thin, flexible material such as a polymer or metal. In one advantageous embodiment, the elongate member 24 is formed of Delrin®, a product of DuPont.

The helical delivery chute 17 has the shape of a helical elongate member. The term "helical" in the context of the invention is meant to include both a twisted linear shape and a helically exaggerated shape, which are distinguishable as follows. A centerline through the cross section of a twisted linear shape defines a straight line that is colinear with a central axis of the twisted linear shape. Alternatively, a centerline through a helically exaggerated shape defines a path of a helix, for example a circular helix, which spirals about, and is offset from, a central axis. In the case of a circular helix, the offset distance between the centerline of the helically exaggerated shape and the central axis is the same at all points along the centerline. Increasing the offset distance increases the exaggeration of the helically exaggerated shape. Decreasing the offset distance decreases the exaggeration of the helically exaggerated shape. If the offset distance is decreased to zero, the centerline is no longer offset from the central axis and the resulting shape is a twisted linear shape.

Two characteristic measures of a helical, thread-like shape are pitch and lead length. Pitch is defined as the distance between successive similar sections of the helical delivery chute 17 that occur in a path parallel to the central axis of the helical delivery chute 17. Lead length is the distance that each pill 5 travels in the direction of the central axis of the helical delivery chute 17 as the pill 5 rotates one revolution. In the case of a helical delivery chute 17 that is shaped as a single helix, as shown in FIGS. 1 and 2, the pitch is equal to one-half the lead length. Preferably, the lead length of the helical delivery chute 17 is between about one and four inches, and more preferably about two inches. Thus, each pill 5 preferably rotates between about 90 degrees and 360 degrees for each inch that the pill 5 proceeds through the feeder tube 10. Increasing the lead length of the delivery chute 17 generally permits each pill 5 to slide more easily through the chute 17, while decreasing the lead length generally decreases the incidence of shingling of the pills 5 upon one another. Thus, the ideal lead length for a particular type of pill 5 varies depending on the characteristics of the pill 5, including the shape, size, and surface texture, as well as the variation in characteristics between pills 5 of a common lot.

Figure 4A:
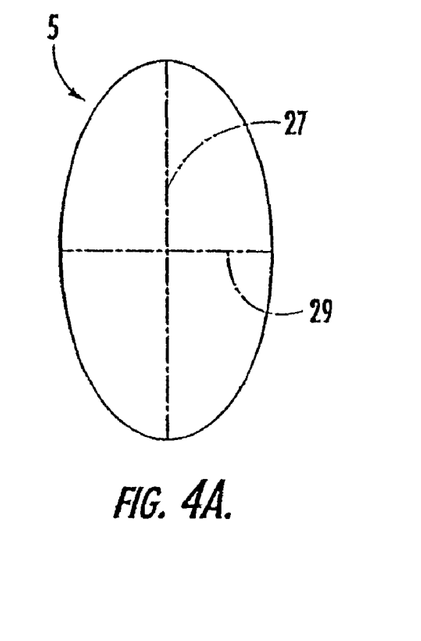
FIG. 4A is an elevation view of an exemplary pill for use with embodiments of the present invention.
Figure 4B:
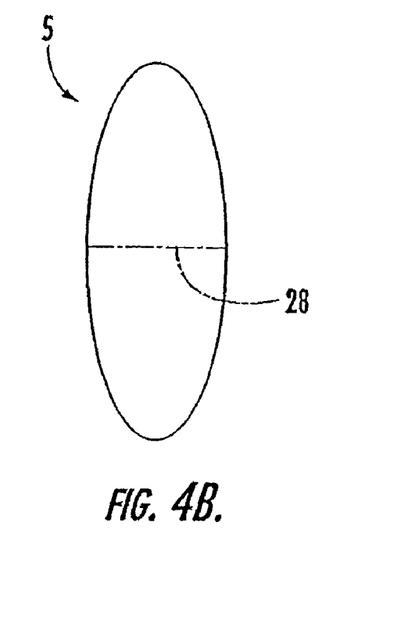
FIG. 4B is an orthogonal elevation view of the pill shown in FIG. 4A.

As shown in FIGS. 2 and 2A, the helical delivery chute 17 has a cross-sectional shape of a polygon, preferably a rectangle, which is uniformly rotated along the length of the helical delivery chute 17. The polygon shape of the cross section of the helical delivery chute 17 corresponds to the shape of the inlet 18 and exit 19. The common shape of the cross section of the helical delivery chute 17, inlet 18, and exit 19 is designed to accommodate and correspond to the shape of the pills 5, which are fed through the helical delivery chute 17 of the feeder tube 10. The pills 5 may have a variety of shapes, but each defines a major dimension 27 and first and second transverse dimensions 28, 29. An exemplary pill 5 is shown in FIGS. 4A and 4B. The first and second transverse dimensions 28, 29 are perpendicular to the major dimension 27, and the first transverse dimension 28 is preferably shorter than the second transverse dimension 29. The second transverse dimension 29 is equal to or shorter than the length of the major dimension 27. Additionally, when the pills 5 are disposed in the helical delivery chute 17 and proceeding in a direction generally parallel to the direction of the major dimension 27, the first and second transverse dimensions 28, 29 generally correspond to the dimensions of the cross section of the helical delivery chute 17. As the pills 5 proceed, for example, by falling through the helical delivery chute 17, each pill 5 is forced to rotate about an axis parallel to its major dimension 27.

Figure 4C:
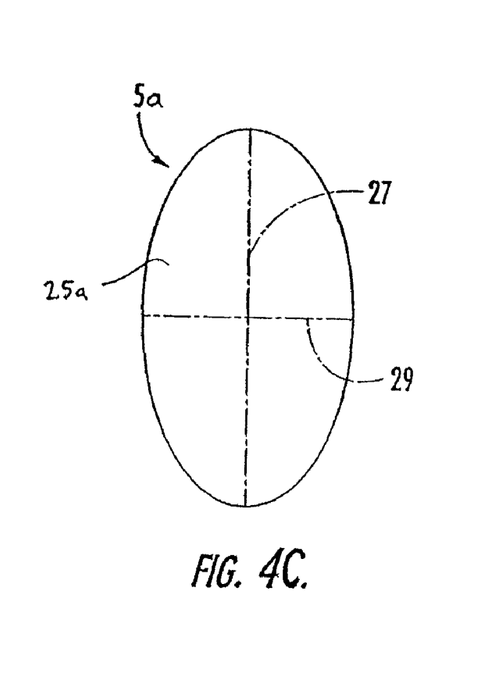
FIG. 4C is an elevation view of another exemplary pill for use with embodiments of the present invention.
Figure 4D:
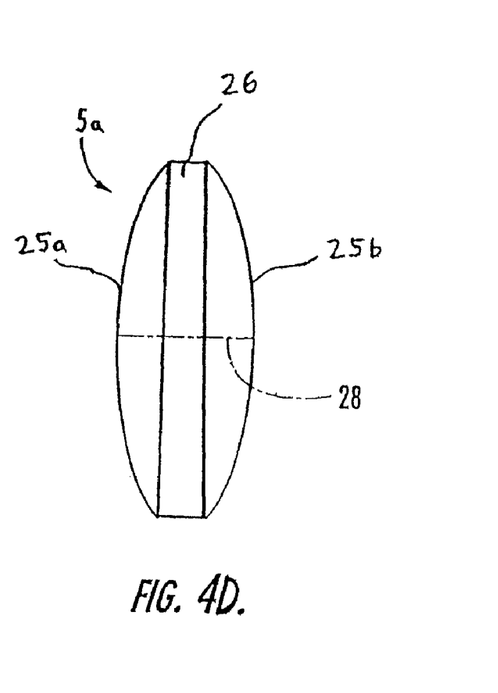
FIG. 4D is an orthogonal elevation view of the pill shown in FIG. 4C.

FIGS. 4C and 4D illustrate another exemplary pill 5a, which defines opposed surfaces 25a, 25b and an elliptical portion 26 therebetween. The pill 5a similarly defines the major and first and second transverse dimensions 27, 28, 29. The opposed surfaces 25a, 25b are convexly curved such that the first transverse dimension 28 is the equal to a sum of a width of the elliptical portion 26 and an eccentricity of each of the surfaces 25a, 25b. It has been observed that a relatively shorter lead length is preferred for pills 5a with surfaces 25a, 25b of increased eccentricity, and a longer lead length is preferred for pills 5a with wider elliptical portions 26. For example, in one embodiment, the first transverse dimension of the pill 5a is about 0.125 inch, the elliptical portion 26 being about 0.060 inch in width and each surface 25a, 25b having an eccentricity of about 0.0325 inch, and the lead length of the helical delivery chute 17 is about 2 inches. It is understood that the pills 5, 5a as well as other alternative shapes and sizes of the pills 5, 5a can be used with the packaging apparatus 1 of the present invention.

Due to the rotation of the pills 5 as they proceed through the helical delivery chute 17, adjacent pills 5 in the helical delivery chute 17 are positioned in successive rotational positions. Thus, if multiple pills 5 are positioned adjacently in the helical delivery chute 17, the first transverse dimension 28 of each pill 5 is not parallel to the first transverse dimension 28 of the immediately adjacent pills 5. The successively rotated positions of the adjacent pills 5 decrease the likelihood that each pill 5 will become wedged between an adjacent pill 5 and the helical delivery chute 17. Thus, the pills 5 are less likely to shingle upon one another and block passage of pills 5 through the helical delivery chute 17.

A packaging apparatus 1 as shown in FIG. 1 includes a pill delivery apparatus 2 supported by a frame 20. The pill delivery apparatus 2 is comprised of the feeder tube 10, the tray 39 located above the feeder tube 10, and a drop chute 60 located below the feeder tube 10. The pills 5 are disposed on the tray 39 and fed into the delivery chute 17 of the feeder tube 10. After falling through the feeder tube 10, the pills 5 enter the drop chute 60, which further guides the pills 5 toward the receptacles 7.

Figure 5:
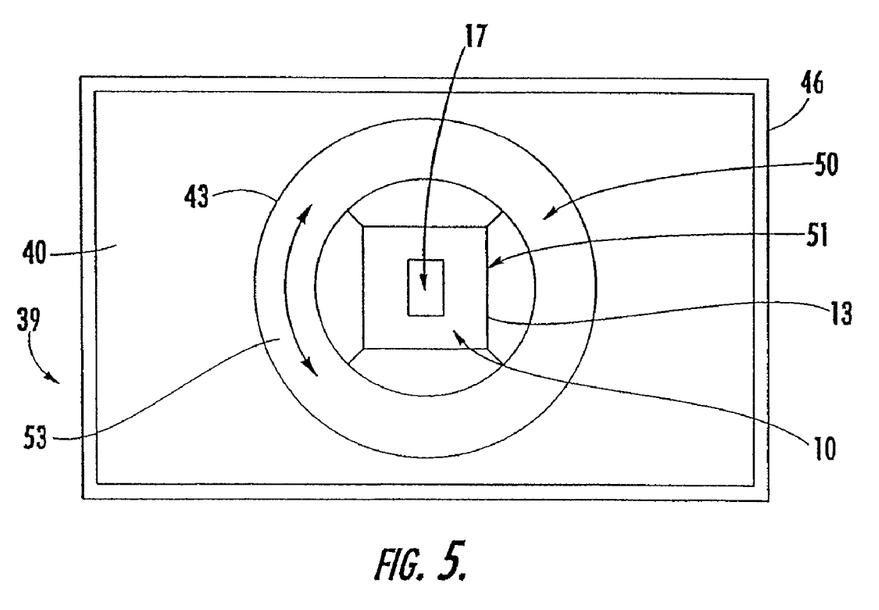
FIG. 5 is a plan view of a packaging apparatus as shown in FIG. 1.

The tray 39 comprises an outer tray 40, which defines an outer tray aperture 43, and a rotatable inner tray 50 that is rotatably connected to the outer tray 40 such that the rotatable inner tray 50 rotates within the outer tray aperture 43. The rotatable inner tray 50 may be attached to the outer tray 40 in a variety of manners. For example, as shown in FIG. 5, a circular shape of the outer perimeter of the rotatable inner tray 50 can correspond to the shape of the outer tray aperture 43 such that the rotatable inner tray 50 fits in the outer tray aperture 43. A bearing assembly, retaining clip, snap ring, or other rotational attachment device can be fit between the trays 40, 50. The attachment device rotatably connects the two trays 40, 50 and retains the rotatable inner tray 50 in the outer tray aperture 43.

Figure 6:
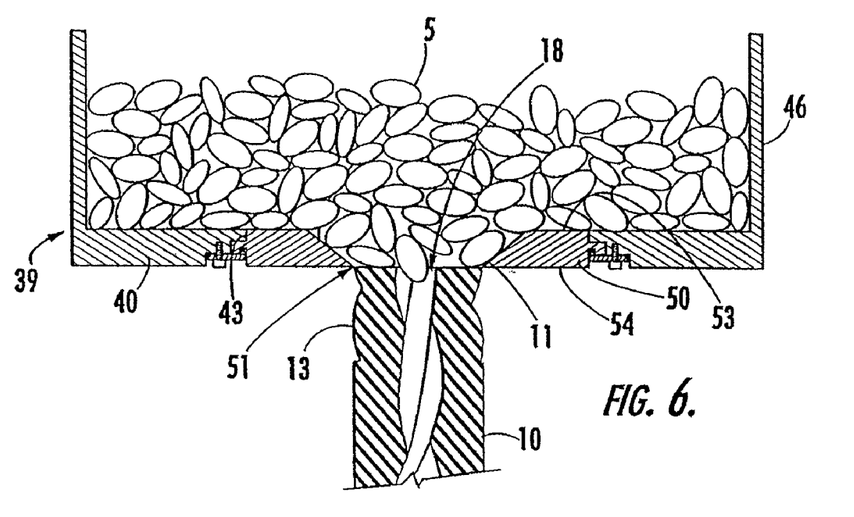
FIG. 6 is a cross-sectional view of a packaging apparatus as shown in FIG. 1 taken at line 6-6 of FIG. 1.

As shown in FIG. 6, the rotatable inner tray 50 also defines an inner tray aperture 51 that corresponds to the feeder tube 10 so that the feeder tube 10 can be inserted into the inner tray aperture 51. In one advantageous embodiment, the inner tray aperture 51, as defined by a lower surface 54 of the rotatable inner tray 50, is square. Preferably, the inner tray aperture 51 is larger in area as defined by an upper surface 53 of the rotatable inner tray 50 than as defined by the lower surface 54 thereof. Thus, the inner tray aperture 51 tapers in the downward direction, and the taper facilitates the movement of the pills 5 disposed on the trays 40, 50 toward the inlet 18 of the feeder tube 10. Additionally, the inner tray aperture 51 as defined by the upper surface 53 may have a different shape than as defined by the lower surface 54. For example, as shown in FIG. 5, the inner tray aperture 51 may be square as defined by the lower surface 54 and circular as defined by the upper surface 53.

Figure 7:
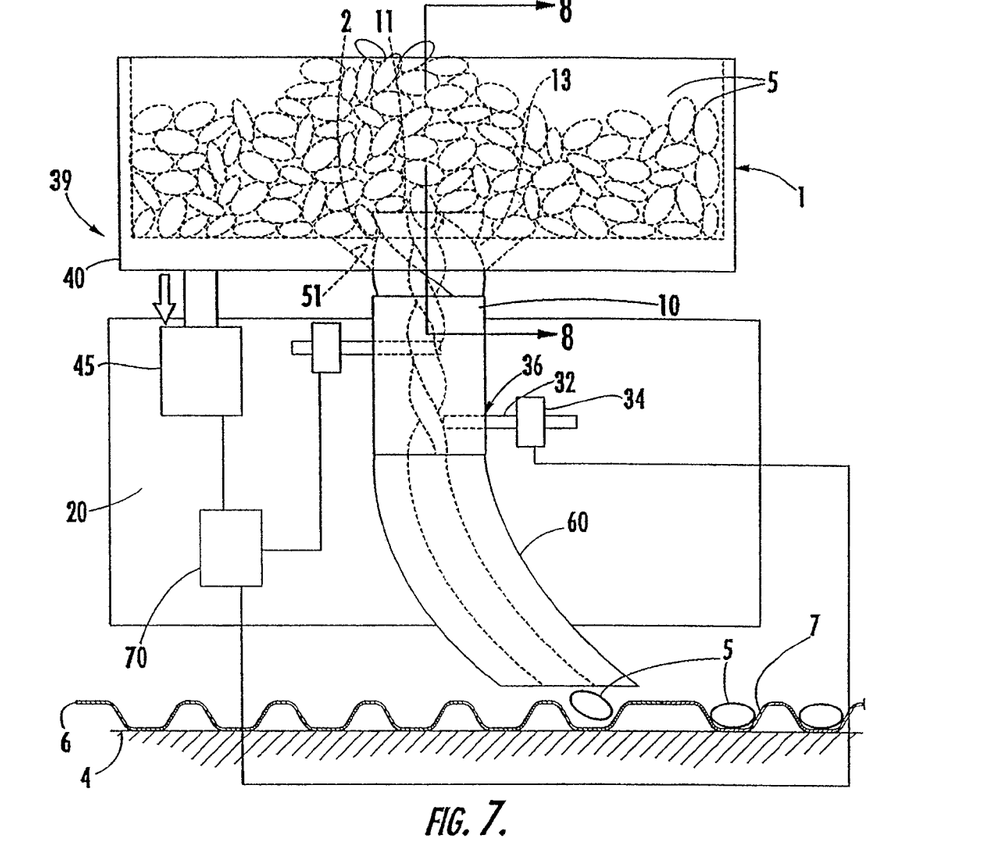
FIG. 7 is a cross-sectional schematic of a packaging apparatus as shown in FIG. 1 with the tray in the lowered position.
Figure 8:
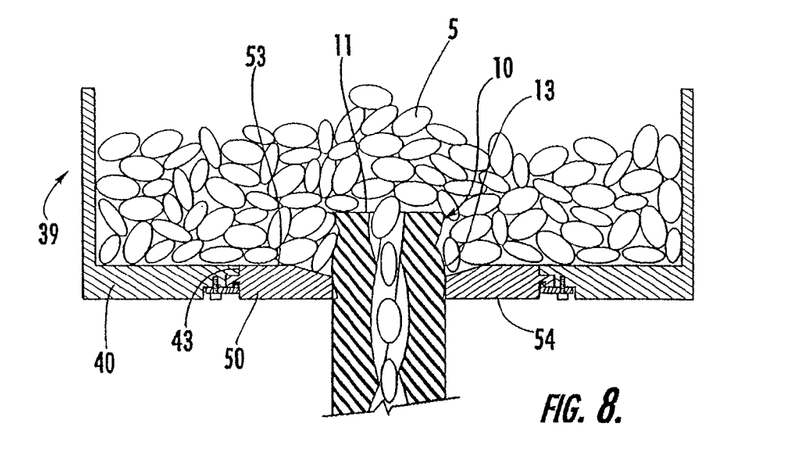
FIG. 8 is a cross-sectional view of a packaging apparatus as shown in FIG. 7 taken at line 8-8 of FIG. 7.

As shown in FIG. 1, a controller 70 is communicatively attached to, and controls, a tray actuator 45, which alternatingly raises and lowers the trays 40, 50. At the raised position of the trays 40, 50, the lower surface 54 of the rotatable inner tray 50 is proximate to the inlet side 11 of the feeder tube 10, as shown in FIG. 6. At the lowered position of the trays 40, 50, the upper surface 53 of the rotatable inner tray 50 is as low or lower than the inlet side 11 of the feeder tube 10, as shown in FIGS. 7 and 8. The axially reciprocating action of the trays 40, 50 agitates the pills 5 that are disposed on the trays 40, 50.

In one advantageous embodiment, the inner tray aperture 51 at the lower surface 54 of the rotatable inner tray 50 defines a shape that closely corresponds to the shape of the outer surface 13 of the feeder tube 10. The helical outer contour 14 of the outer surface 13 acts as a guide for the inner tray aperture 51. The outer surface 13 of the feeder tube 10 shown in the figures may extend from the inlet side 11 along only a portion of the feeder tube 10. Alternatively, the helical outer surface 13 could extend along the entire length of the feeder tube 10. As the trays 40, 50 are raised or lowered relative to the feeder tube 10 by the tray actuator 45, the engagement of the inner tray 50 and the helical outer surface 13 causes the rotatable inner tray 50 to rotate. Due to the rotatable connection between the trays 40, 50, the outer tray 40 does not rotate, and the rotatable inner tray 50 rotates relative to both the outer tray 40 and the feeder tube 10. The rotation of the rotatable inner tray 50 agitates the pills 5, facilitating the movement of the pills 5 toward the inlet 18 and the entry of the pills 5 into the inlet 18. In the event that one or more pills 5 become stuck at the entrance of the delivery chute 17, the rotation of the rotatable inner tray 50 will tend to dislodge the stuck pill(s) 5.

As shown in FIGS. 1 and 7, the pill delivery apparatus 2 also includes an upper pin 31 and a lower pin 32 actuated by an upper pin actuator 33 and a lower pin actuator 34, respectively. The controller 70 is communicatively attached to the pin actuators 33, 34 and controls the pin actuators 33, 34 and hence the pins 31, 32. The pins 31, 32 are extendable into the feeder tube 10 through upper and lower pin openings 35, 36. The pins 31, 32 can be alternately moved in and out of the delivery chute 17 so as to form an escapement mechanism allowing only one pill 5, or a certain number of pills 5, to pass therethrough at a time. For example, the pins 31, 32 can first be configured so that the upper pin 31 is retracted, the lower pin 32 is extended, and pills 5 are held within the helical delivery chute 17 of the feeder tube 10. For a single pill escapement mechanism, the pins 31, 32 are spaced at an interval such that at least one whole pill 5 fits between the upper and lower pins 31, 32 when the pins 31, 32 are extended. With one pill 5 positioned in the helical delivery chute 17 between the pins 31, 32, the extended lower pin 32 prevents that pill 5 from falling through the helical delivery chute 17. The upper pin actuator 33 extends the upper pin 31, preventing any more pills 5 from passing through the helical delivery chute 17 past the upper pin 31. The upper pin 31 may be interjected between the adjacent pills 5, or the pin 31 may push the second-lowest pill against the opposite side of the chute 17, thus eliminating any risk that the lowest pill will be unintentionally pushed against the opposite wall of the chute (and thus trapped) by the upper pin 31. Such an arrangement can be seen in FIG. 12 and is known in the art.

The lower pin actuator 34 then retracts the lower pin 32 and releases the one pill 5 from the escapement mechanism and the pill 5 proceeds to the exit 19 of the helical delivery chute 17 and is released. After releasing the pill 5, the lower pin actuator 34 extends the lower pin 32 and the upper pin actuator 33 retracts the upper pin 31 so that the pills 5 in the delivery chute 17 advance and one pill 5 is again positioned between the upper and lower pins 31, 32. For a multiple pill escapement mechanism, the pins 31, 32 are spaced at a greater interval so that multiple pills 5 fit between the two pins 31, 32. A multiple pill escapement mechanism may release and deliver a plurality of pills 5 as one group. The pins 31, 32 may be formed of a variety of materials, but in one advantageous embodiment, the pins 31, 32 are rubber to reduce the likelihood that the pills 5 will be damaged in the event that the pins 31, 32 contact the pills 5.

A packaging apparatus 1 as shown in FIGS. 1 and 7 may also include a conveyor 4. The conveyor 4 can be any type of conveyor capable of moving a series of empty containers 6 along a predetermined path of travel adjacent to the packaging apparatus 1. The conveyor 4 may move the containers 6 intermittently or continuously. In one embodiment, the conveyor 4 moves the containers 6, which each define a plurality of pill receptacles 7, under the drop chute 60, stopping intermittently with each container 6 in a position adjacent to the drop chute 60. In another embodiment, however, the conveyor 60 moves continuously and at least part of the packaging apparatus 1 moves parallel to the path of the containers 6, as taught in U.S. Pat. No. 5,737,902 to Aylward, which is herein incorporated by reference.

Figure 9:
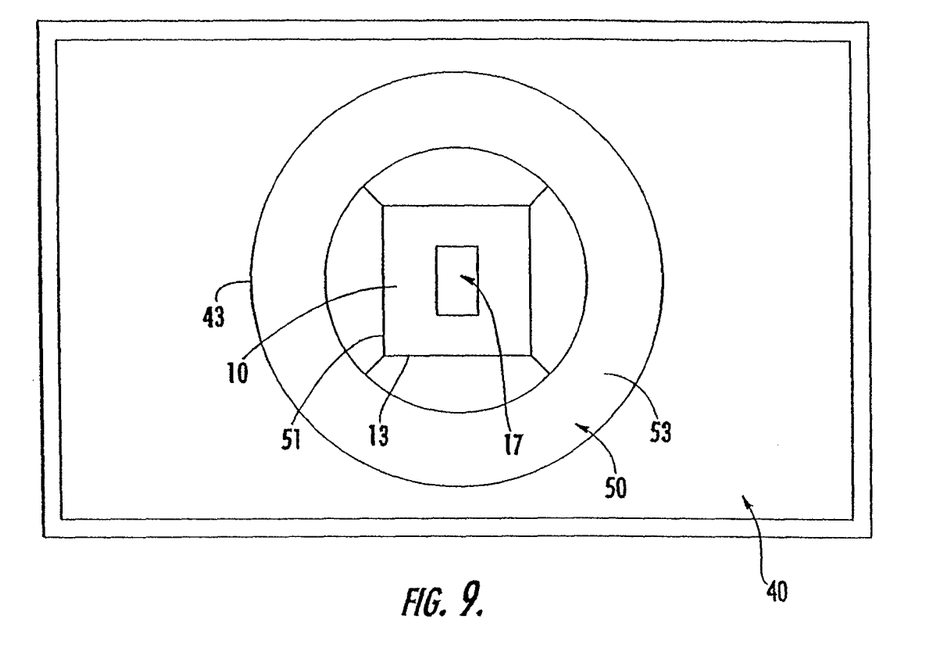
FIG. 9 is a plan view of a pill delivery apparatus according to embodiments of the present invention.
Figure 10:
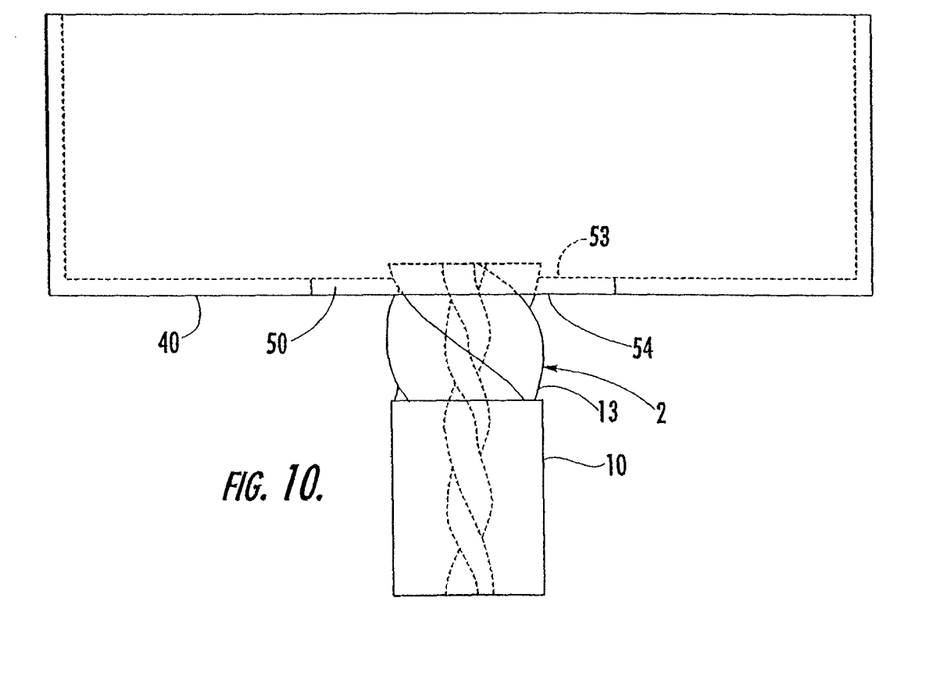
FIG. 10 is an elevation view of a pill delivery apparatus as shown in FIG. 9.

FIGS. 9 and 10 illustrate an alternative embodiment of a pill delivery apparatus 2. The rotatable inner tray 50 is rotatably attached by a snap ring (not shown) to the outer tray 40 within the outer tray aperture 43. The inner tray aperture 51 of the rotatable inner tray 50 corresponds closely to the outer surface 13 of the feeder tube 10. Similarly to the previously described pill delivery apparatus 2 of FIGS. 1 and 7, the pill delivery apparatus 2 shown in FIGS. 9 and 10 is alternatingly raised and lowered. The helical outer contour of the outer surface 13 acts as a guide to the inner tray aperture 51, and as the trays 40, 50 are raised or lowered relative to the feeder tube 10, the rotatable inner tray 50 rotates. The inner tray aperture 51 may also define a uniform shape, such as a square between the upper and lower surfaces 53, 54 of the rotatable inner tray 50. The uniform shape of the inner tray aperture 51 corresponds to the outer surface 13 of the feeder tube 10.

The feeder tubes 10 and other components of the packaging apparatus 1 may be formed from a variety of materials including, but not limited to, plastic, aluminum, steel, or other polymers or metals. The choice of material depends upon such factors as material cost, manufacturing time and cost, and such material characteristics as strength, durability, flexibility, and surface roughness. In one advantageous embodiment, the feeder tube 10 is formed of nylon. In another advantageous embodiment, the feeder tube 10 is formed of a material that is impregnated with Teflon®, a product of DuPont.

The feeder tubes 10 can be formed by injection molding, casting, machining, or a variety of rapid prototyping methods such as fused deposition modeling. In one preferred embodiment, the feeder tubes 10 are formed by fused deposition modeling, in which a continuous filament of a thermoplastic polymer is heated, plasticized, and deposited in successive layers. The polymer solidifies shortly after being deposited so that the successive layers can be deposited thereon, thus incrementally forming the feeder tube 10. Voids can be formed by depositing a soluble material that supports the successive polymer layers but can be dissolved after the successive polymer layers solidify. For example, the soluble material can be dissolved by water. Fused deposition modeling is further described in U.S. Pat. No. 5,121,329 to Crump, titled "Apparatus and method for creating three-dimensional objects," the entirety of which is incorporated herein by reference. Fused deposition modeling can be used to produce tubes 10 from polymers such as polycarbonate, polyethylene, or other polymers, such as polymers that are approved by the Food and Drug Administration for use in pill packaging machines. Additionally, fused deposition modeling can be used to produce other portions of the packaging apparatus 1 such as the tray 39.

Figure 11:
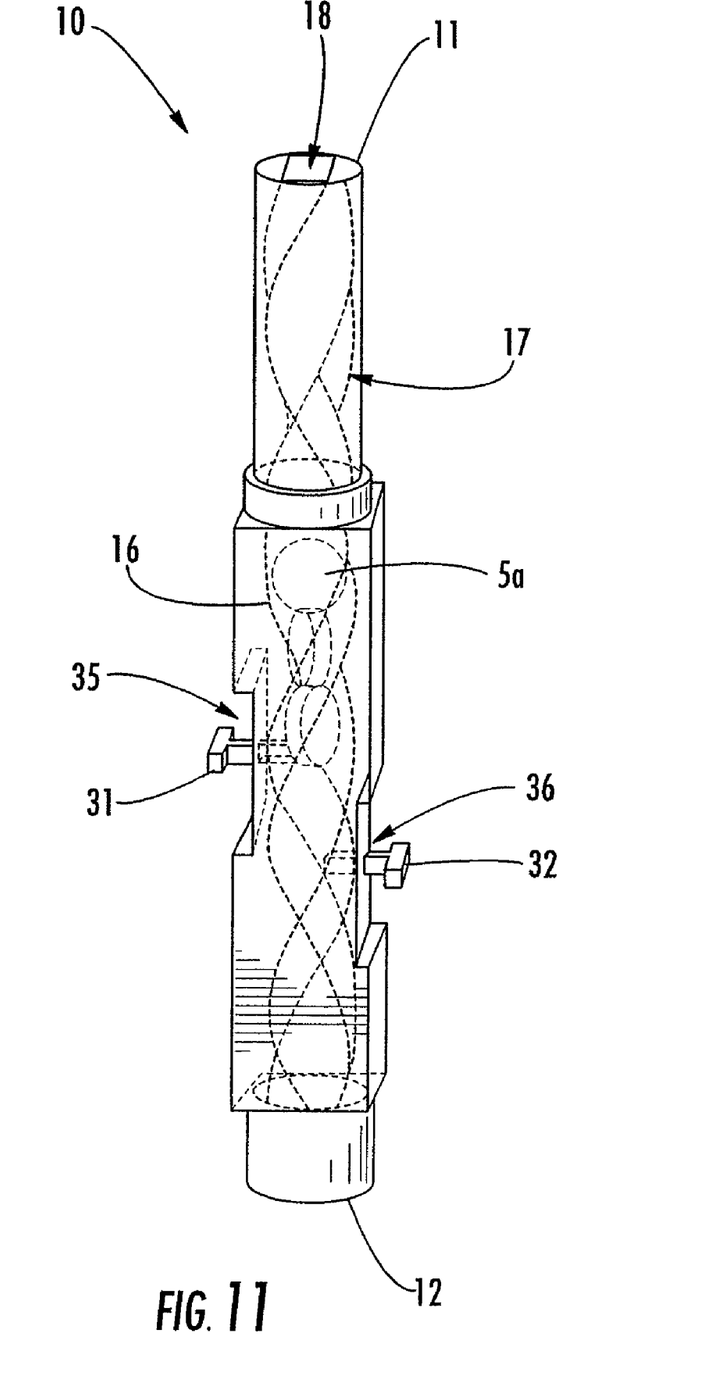
FIG. 11 is a partially transparent view of a feeder tube formed by fused deposition modeling according to one embodiment of the present invention.

For example, there is shown in FIG. 11 the feeder tube 10 according to one embodiment of the invention that has been formed by fused deposition modeling. The feeder tube 10 defines the delivery chute 17, which extends between the inlet and exit sides 11, 12. The upper and lower pins 31, 32 are shown in extended positions so that the pills 5a are held stopped in the chute 17. As illustrated, the pills 5a are rotated to different rotational configurations in the chute 17 such that consecutive pills 5a do not shingle, even when stopped by the pins 31, 32. The pins 31, 32 can be formed as an integral part of the tube 10 by depositing a water soluble material at the apertures 35, 36, i.e., between the pins 31, 32 and the tube 10, to support the deposition of successive layers of material, and dissolving the water soluble material after the successive polymer layers solidify.

FIG. 12 illustrates a conventional dispensing tube T with a straight delivery chute as is known in the art. The pins N1, N2 are configured to control the release of the pills from the tube T. As illustrated, the pills P are shingled in the tube T such that the pills are prevented from falling therethrough.

It will be understood that a packaging apparatus 1 according to embodiments of the present invention can comprise any number of feeder tubes 10 for simultaneously filling a plurality of containers 6 or pill receptacles 7. Each feeder tube 10 can include any number of helical delivery chutes 17. Also, while drop chutes 60 are used in the exemplary embodiments described above, the feeder tubes 10, in an alternative embodiment, may guide the pills 5 directly to the containers 6 or pill receptacles 7, making the drop chutes 60 unnecessary. The feeder tubes 10 and the drop chutes 60 may also be straight or curved along the length thereof.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a pill delivery apparatus, the method comprising: forming a feeder tube for delivering pills and defining a delivery chute, wherein forming the feeder tube comprises: plasticizing a thermoplastic polymer; depositing the polymer in successive layers to define a feeder tube for delivering pills to a container, the feeder tube having an inlet side and an exit side opposed to the inlet side and defining a helical delivery chute extending between the inlet side and the exit side, the helical delivery chute configured to rotate each pill at least one revolution as the pill proceeds there through and deliver pills there through such that each of a plurality of pills successively delivered through the helical delivery chute will be oriented at successive rotational positions along the helical delivery chute so as to prevent jamming of the pills with respect to other pills in the delivery chute; and solidifying the polymer; and operably engaging the feeder tube with a tray having an upper surface adapted to contain a plurality of pills thereon having different orientations, the tray defining an inner tray aperture, the feeder tube extending from the inner tray aperture and being adapted to deliver each pill among the pills having different orientations within the tray to a container.

2. A method of forming a pill delivery apparatus according to claim 1, wherein forming a feeder tube further comprises:
   depositing a soluble material such that the soluble material supports at least a portion of the polymer; and
   dissolving the soluble material subsequent to said solidifying step to thereby define a void in the feeder tube.

3. A method of forming a pill delivery apparatus according to claim 2 wherein said dissolving step comprises dissolving the soluble material with water.

4. A method of forming a pill delivery apparatus according to claim 2 wherein said depositing step comprises depositing the soluble material and the polymer in at least one aperture defined in the tube, and wherein said dissolving step comprises dissolving the soluble material to form a pin in each aperture such that the pin is formed as an integral part of the tube.

5. A method of forming a pill delivery apparatus according to claim 1 wherein said plasticizing, depositing, and solidifying steps comprise forming the feeder tube of nylon.

6. A method of forming a pill delivery apparatus according to claim 1 wherein said plasticizing, depositing, and solidifying steps comprise forming the feeder tube of a material that is impregnated with polytetrafluoroethylene.

7. A method of forming a pill delivery apparatus according to claim 1 wherein said plasticizing, depositing, and solidifying steps comprise forming the feeder tube of one of the group consisting of polycarbonate and polyethylene.

8. A method of forming a pill delivery apparatus according to claim 1 wherein said plasticizing, depositing, and solidifying steps comprise heating, plasticizing, and depositing a continuous filament of a thermoplastic polymer in successive layers.

9. A method of forming a pill delivery apparatus according to claim 1 wherein said depositing and solidifying steps comprise forming the feeder tube such that the helical delivery chute defines one of the group consisting of a twisted linear shape and a helically exaggerated shape.

10. A method of forming a pill delivery apparatus according to claim 1, wherein forming a feeder tube comprises forming the feeder tube such that the delivery chute is configured to rotate each pill a plurality of revolutions as the pill proceeds therethrough.

11. A method of forming a pill delivery apparatus according to claim 1, wherein forming the feeder tube comprises forming the feeder tube such that the feeder tube defines a delivery chute having an outer surface defining a helical outer contour.

12. A method of forming a pill delivery apparatus according to claim 1, wherein forming the feeder tube comprises forming the feeder tube such that the inlet side defines an inlet for receiving each pill having a largest cross-sectional dimension substantially smaller than the inlet side.

13. A method of forming a pill delivery apparatus, the method comprising: forming a feeder tube for delivering pills and defining a delivery chute, wherein forming the feeder tube comprises: plasticizing a thermoplastic polymer; depositing the polymer in successive layers to define a feeder tube for delivering pills to a container, the feeder tube having an inlet side and an exit side opposed to the inlet side and defining a helical delivery chute extending between the inlet side and the exit side, the feeder tube having an outer surface defining a helical outer contour, the helical delivery chute configured to rotate each pill at least one revolution as the pill proceeds there through and deliver pills there through such that each of a plurality of pills successively delivered through the helical delivery chute will be oriented at successive rotational positions along the helical delivery chute so as to prevent jamming of the pills with respect to other pills in the delivery chute; and solidifying the polymer.

14. A method of forming a pill delivery apparatus according to claim 13, further comprising operably engaging the feeder tube with a tray having an upper surface adapted to contain a plurality of pills thereon having different orientations, the tray defining an inner tray aperture, the feeder tube extending from the inner tray aperture and being adapted to deliver each pill among the pills having different orientations within the tray to a container.

15. A method of forming a pill delivery apparatus, the method comprising: forming a feeder tube for delivering pills and defining a delivery chute, wherein forming the feeder tube comprises: plasticizing a thermoplastic polymer; depositing the polymer in successive layers to define a feeder tube for delivering pills to a container, the feeder tube defining an inlet side and an exit side opposed to the inlet side, the feeder tube defining a helical delivery chute extending between the inlet side and the exit side, the inlet side defining an inlet for receiving each pill having a largest cross-sectional dimension substantially smaller than the inlet side, the helical delivery chute configured to rotate each pill at least one revolution as the pill proceeds there through and deliver pills there through such that each of a plurality of pills successively delivered through the helical delivery chute will be oriented at successive rotational positions along the helical delivery chute so as to prevent jamming of the pills with respect to other pills in the delivery chute; and solidifying the polymer.

16. A method of forming a pill delivery apparatus according to claim 15, further comprising operably engaging the feeder tube with a tray having an upper surface adapted to contain a plurality of pills thereon having different orientations, the tray defining an inner tray aperture, the feeder tube extending from the inner tray aperture and being adapted to deliver each pill among the pills having different orientations within the tray to a container.

* * * * *